March 14, 1967  A. D. DE SHANO  3,308,860
STUMP CUTTER

Filed Nov. 27, 1964  4 Sheets-Sheet 1

INVENTOR.
ALPHONSE D. DeSHANO
BY
*J. Warren Kinney, Jr.*
ATTORNEY

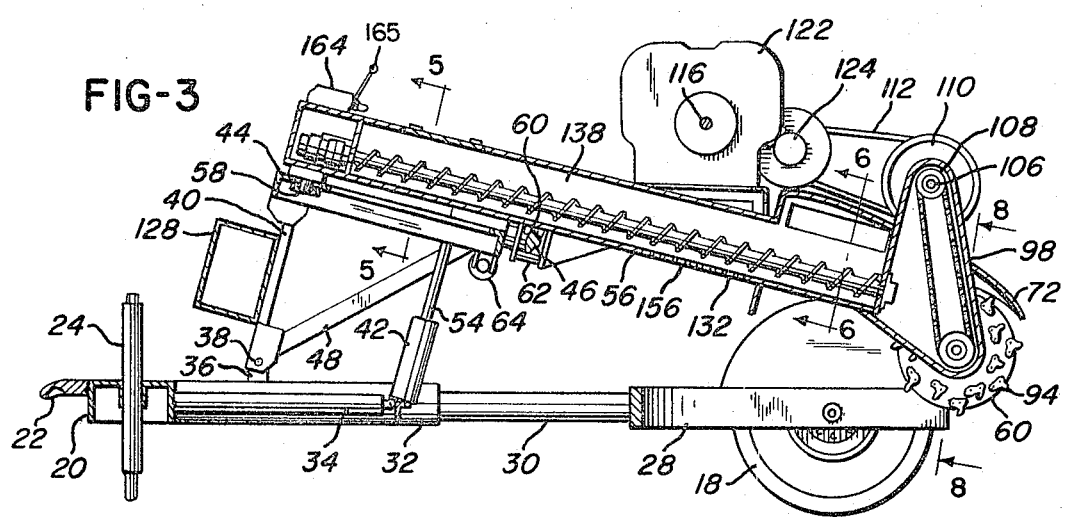

March 14, 1967 A. D. DE SHANO 3,308,860
STUMP CUTTER
Filed Nov. 27, 1964 4 Sheets-Sheet 3
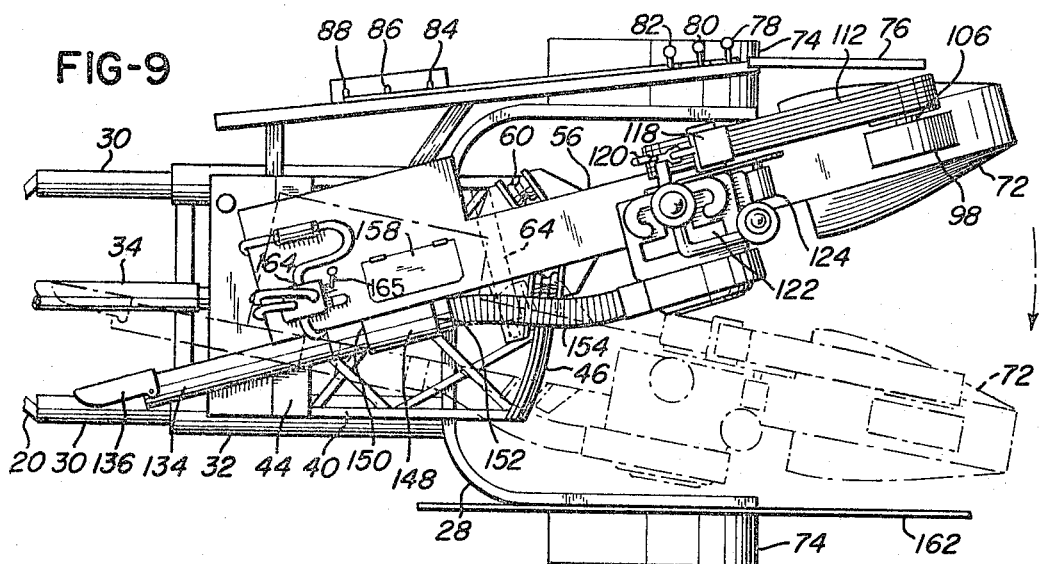
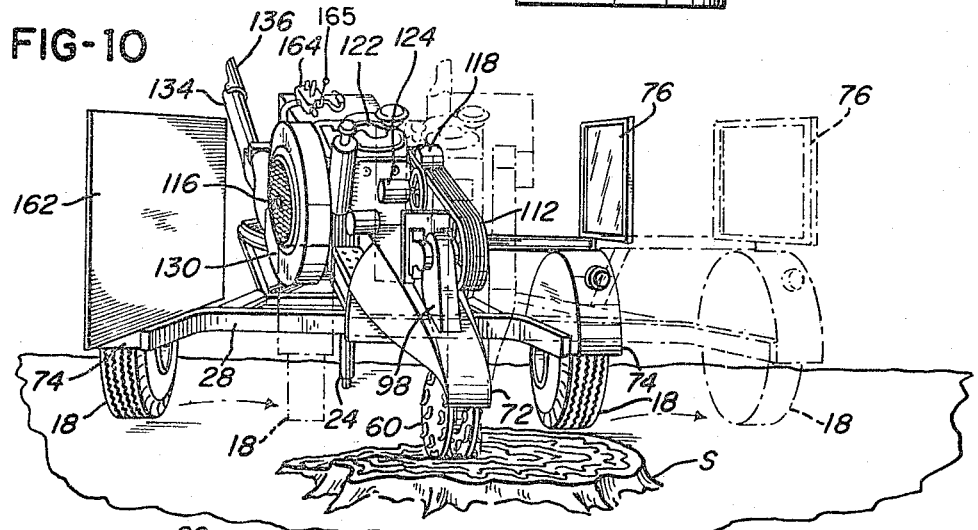
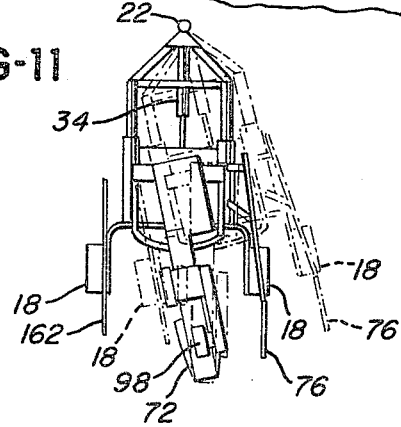
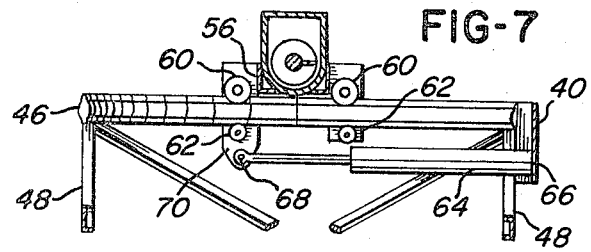
INVENTOR.
ALPHONSE D. DeSHANO
BY
J. Warren Kinney Jr.
ATTORNEY

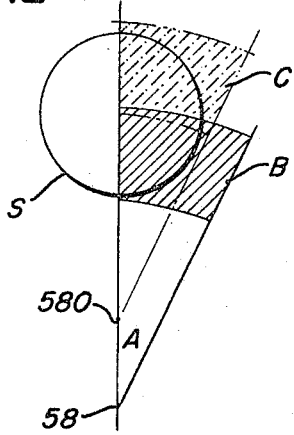
FIG-12
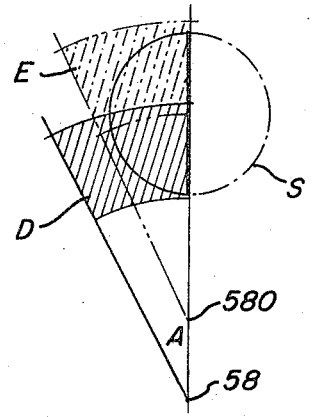
FIG-13
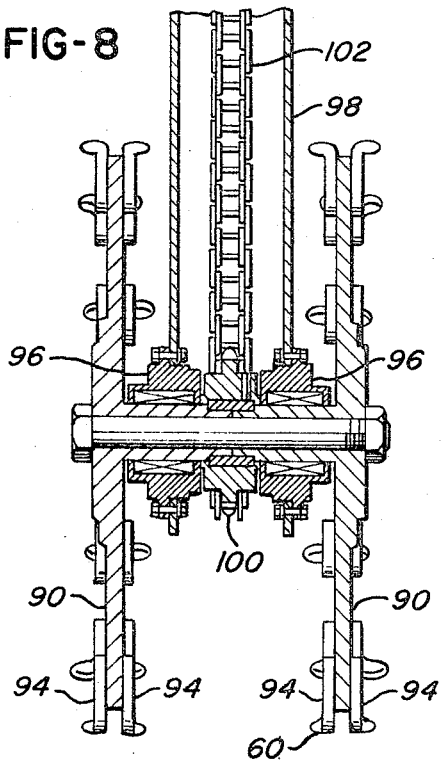
FIG-8
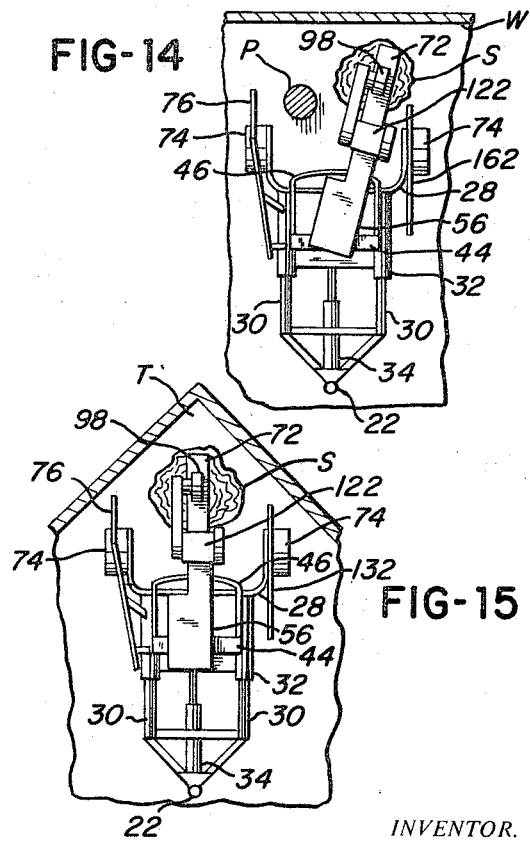
FIG-14
FIG-15
INVENTOR.
ALPHONSE D. DeSHANO
BY J. Warren Finney Jr.
ATTORNEY

United States Patent Office 3,308,860
Patented Mar. 14, 1967

3,308,860
STUMP CUTTER
Alphonse D. De Shano, Hamilton, Ohio, assignor to The Tool Steel Gear & Pinion Company, Cincinnati, Ohio
Filed Nov. 27, 1964, Ser. No. 414,070
18 Claims. (Cl. 144—2)

The present invention relates to a stump cutter, or disintegrator of tree stumps which remain approximately at ground level after a tree has been felled. The primary purpose of the device is to cut or chip away the tree stump to the extent of reducing it to a level well below grade, as may often be desirable or necessary.

An object of the invention is to provide an improved compact stump cutter constructed to possess a high degree of maneuverability, with resultant economical, speedy, and thorough performance.

Another object of the invention is to provide an improved stump cutter which is so constructed as to withstand the effects of hard usage, thereby reducing to a minimum the need for frequent servicing and repairs.

A further objective is to provide a method and means in a device of the character stated; for minimizing labor and fatigue on the part of the operator, so that the stump cutting procedure may be performed effectively and profitably with substantial savings of time and hand labor.

Another object of the invention is to so construct a stump cutter as to reduce to a practical minimum, the set-up time required for placing the machine in cutting operation under various cutting conditions.

A further object is to provide in connection with a stump cutter, highly effective means for disposing of the chips or cuttings continuously during the cutting operation, thereby to expose the stump to view at all times in aid of efficient maneuvering of the cutting tool by the operator.

The foregoing and other objects are attained by the means described herein and illustrated upon the accompanying drawings, in which:

FIG. 3 is a vertical cross-section longitudinally of the machine, showing the cutting tool retracted from operative position.

FIG. 4 is a vertical cross-section longitudinally of the machine, showing the cutting tool extended forwardly relative to the chassis, with a broken line indication of the tool lowered for cutting.

FIG. 5 is an enlarged cross-section taken on line 5—5 of FIG. 3, showing details of the chip disposer.

FIG. 6 is an enlarged cross-section taken on line 6—6 of FIG. 3.

FIG. 7 is a cross-section taken on line 7—7 of FIG. 4.

FIG. 8 is an enlarged cross-section taken on line 8—8 of FIG. 3, showing the cutter drive means.

FIG. 9 is a top plan view of the improved stump cutter.

FIG. 10 is a front elevation of the same.

FIG. 11 is a top plan view of the stump cutter, on a greatly reduced scale, showing how the chassis may be shifted to one side while lifted by the cutting head.

FIGS. 12 and 13 are diagrams indicating the scope of cutting performable by the improved machine of the invention.

FIG. 14 is a top plan view on a greatly reduced scale, showing the cutter reaching a stump close to a wall and a pole.

FIG. 15 is a view similar to FIG. 14, showing the cutter reaching a stump in a corner formed by two intersecting walls.

Figure 2:
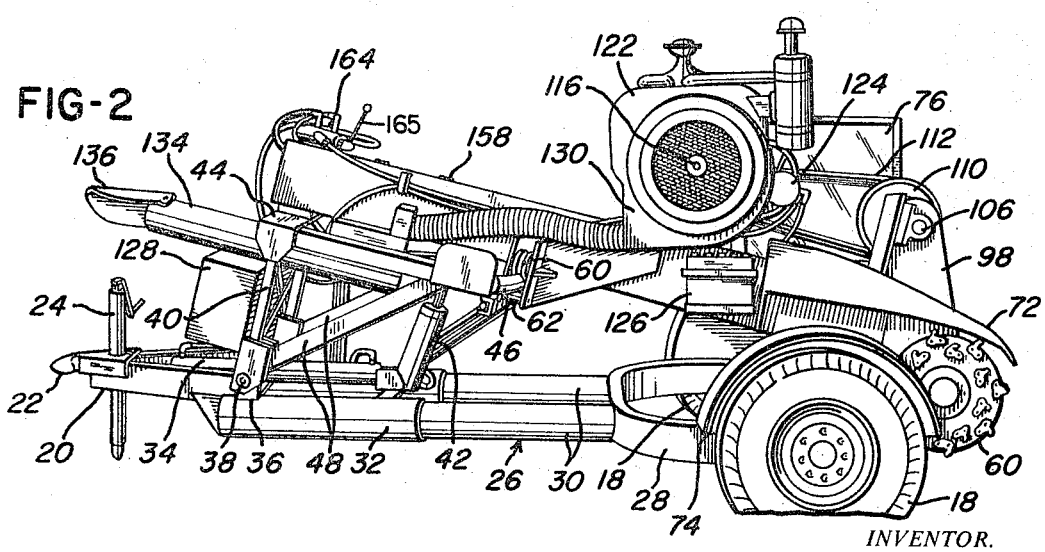
FIG. 2 is a perspective view of the opposite side of the machine.

The stump cutter of the invention is preferably a vehicular structure, having a pair of road wheels 18, FIG. 2, at one end of a tractional frame or chassis, and a draw bar 20 at the opposite end thereof. The draw bar may carry a hitch 22 for towing purposes, and a jack 24 to support the hitch end of the frame when uncoupled from a towing vehicle.

The chassis or main frame, denoted generally by the reference numeral 26, may comprise a yoke 28 whose spaced legs individually carry the wheels 18, and a pair of spaced parallel side rails 30 having opposite ends fixed to the yoke and to draw bar 20. The side rails may be tubular in form, as shown. The side rails, the yoke, and the draw bar constitute a rigid main frame structure or chassis which is mobile by towing.

Slidable lengthwise upon rails 30 is a carriage 32, which may be shifted between the draw bar and the yoke by means of a double-acting hydraulic cylinder 34, which is under the control of an attendant. The carriage includes a pair of upstanding lugs 36, carrying pivot means 38 to support a rock frame 40. The rock frame may be rocked, about its pivots 38, by means of a double-acting hydraulic cylinder 42, which is under the control of the attendant. The cylinder 42 is supported upon carriage 32, so that in all stages of advancement of the carriage along rails 30, the cylinder may be energized to rock frame 40.

Frame 40 carries a saddle 44 and a curved rail 46, both of which parts extend transversely of the main frame 26. Braces such as 48 support the transverse curved rail in rigid relationship to the saddle, so that the rail and the saddle move with the rock frame, and in fact, form integral parts thereof. The elevator cylinder 42 for the rock frame may be hingedly supported at 50 upon a cross member 52 of carriage 32, and its plunger 54 may have hinged connection with the underside of rock frame 40, so that frame 40 may be rocked between limits as indicated by the full lines and the broken lines of FIG. 4.

The saddle 44 and rail 46 support a cantilever frame 56, which at its forward end carries the rotary cutting tool 60. The cantilever frame is pivoted at 58 upon saddle 44, and carries rollers 60 and 62 which ride upon the upper and lower edges of rail 46. The cantilever frame is held to rail 46 as the frame is swung about pivot 58 by means of a double-acting hydraulic cylinder 64.

The limits of lateral swing of frame 56 are indicated upon FIG. 9, and as FIG. 7 clearly indicates, cylinder 64 may be attached at 66 to rocker frame 40, whereas its plunger 68 is connected to a depending part 70 of cantilever frame 56. Movements of the plunger are under the control of an attendant, whose duty is to guide cutter 60 which is shielded by guard 72. Fenders for road wheels 18 are indicated at 74.

Figure 1:
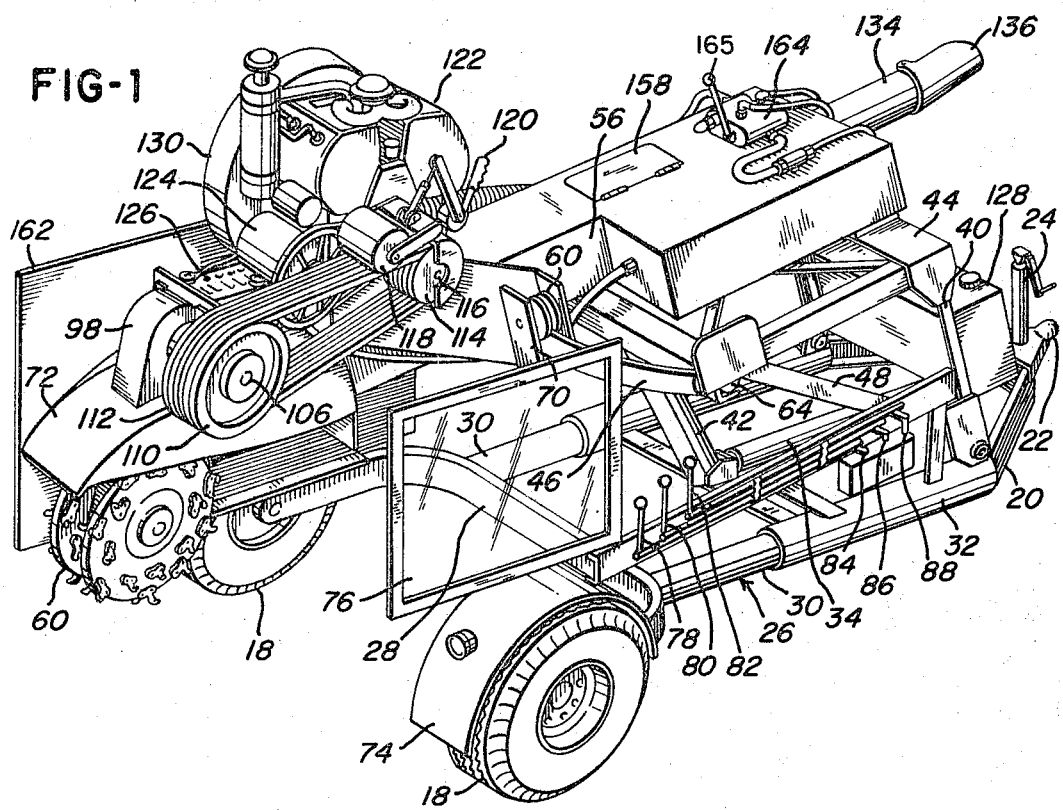
FIG. 1 is a perspective view of the operator's side of the improved stump cutter, showing the shield-protected operator's station and controls.

At the operator's side of the machine, shown in FIG. 1, is located a transparent shield 76 to intercept chips or other objects that might be thrown from rotating cutter 60. Near the shield are located three control levers 78, 80, 82, having connection with three hydraulic reversing valves 84, 86, 88, which direct fluid under pressure to opposite ends of the several hydraulic cylinders 34, 42, and 64. The arrangement is such that each control lever may be moved from a neutral position, at which its associated valve is closed, to either of two operative positions at which its valve directs fluid to one end or the other of a hydraulic cylinder mentioned.

It will be understood, in view of the explanation heretofore given, that an attendant operating one of the levers 78, 80, 82, may move carriage 32 in either direction along the chassis rails 30, to project and retract cutter 60 relative to the length of the chassis; by operating another of the levers, the attendant may elevate and lower the cutter according to FIG. 4; by operating the third lever, the attendant may swing the cutter sidewise in either direction, as suggested by FIG. 9. The speed with which the aforesaid movements may be executed, will depend upon the extent to which the valves 84, 86, 88 are held open by movement of the control levers. For example, lever 78 may be moved but slightly, to partially open its valve 84, so as to impart to the cutter a slow continuous feed across the top of a stump as the cutter rotates to chip away the stump. In like manner, the lever controlling sidewise swing of the cutter (FIG. 9), may be set to regulate the speed of swing as the cutter performs the cutting action.

It may here be noted, with reference to FIGS. 10 and 11, that the chassis of the machine, including both wheels 18, may be re-positioned bodily with relation to the stump by stopping the cutter and placing it atop the stump, and then operating hydraulic cylinder 42 to retract its plunger 54, thereby to lift wheels 18 off the ground. Then, cylinder 64 may be energized to swing the chassis sidewise, as indicated by broken lines 18—18 in FIGS. 10 and 11, after which the wheels may be set upon the ground in the new position, by energizing cylinder 42 to extend its plunger 54. By this procedure, new cutting positions may be obtained without re-setting the jack 24, or without moving a towing vehicle that may be secured to hitch 22. Thus, the machine's hydraulic power may be utilized to lift the wheels 18 off the ground for changing the approach of cutter 60 to the work, with substantial savings of time and labor.

To further explain the foregoing, reference is made to FIGS. 12 and 13, wherein S indicates a stump of unusually large diameter, and 58 indicates the pivot for cantilever frame 56. In FIG. 12, the angle A represents nearly the full lateral swing of the cantilever frame about its pivot 58, and the shaded portion B indicates the area over which cutter 60 performs its work when lowered progressively onto the stump, with carriage 32 retracted.

When the cutter reaches the required depth, it may be raised from cutting position, whereupon the cylinder 34 may be projected to extend the carriage toward yoke 28. The cutter then may be lowered for completing the cut indicated by shaded portion C. When portion C has been cut away to the required depth, about one-half of the stump will have been disintegrated, along with substantial portions of the side roots.

Next, the cutter may be stopped, then elevated above the stump, and swung over onto the uncut half thereof, whereupon full lowering of the cutter by the contraction of cylinder 42 will lift wheels 18 off the ground. Cylinder 64 may then be actuated to laterally swing the chassis bodily about jack 24 or hitch 22, as explained in the foregoing description of FIGS. 10 and 11, to relocate the chassis relative to the stump so that cutting may proceed upon the remaining half of the stump according to FIG. 13. As was explained before, the cutter may first operate within the shaded area D of FIG. 13, and progress to remove material within the shaded area E. Thus, the stump may be disintegrated over its entire area, without loss of time in shifting the jack 24 or any towing vehicle attached to hitch 22.

It will be understood, of course, that the cutter may reach areas C or E by gradual advancement of carriage 32 during the cutting operation, should the operator so desire. The reference numeral 580 indicates the location of pivot 58 at the end of the final cut.

FIG. 14 shows how the cutter may reach beyond the machine chassis to disintegrate a stump S, notwithstanding the presence of such obstacles as a nearby post P or wall W. FIG. 15 shows how the cutter may reach a stump S located in an inside corner T of a wall or building, where other stump cutters under such conditions may be useless.

The cutter 60 may be of the twin head type, comprising a pair of spaced parallel discs 90, 90, fixedly mounted upon a cutter shaft 92, and carrying a multiplicity of replaceable cutting teeth 94. The shaft may be journalled in bearings 96 mounted upon the lower end of a protective housing 98 fixed to the cantilever frame 56. Between the bearings, the disc hubs may support a sprocket 100 to be driven by a chain 102 for rotating the cutter.

Within the housing 98 is located a countershaft 106, carrying a sprocket 108 over which the endless chain 102 is trained. The countershaft carries by preference a pulley 110 driven by multiple belts 112 trained over the driving pulley 114 of a motor shaft 116. The reference numeral 118 indicates a conventional belt tightener which may be manipulated by a handle 120 to engage and disengage the belt drive to the cutter. As will be readily understood, other forms of clutch means may be substituted for the belt tightener, as desired.

Motor 122 may be of any acceptable type, that shown being a commercial internal combustion engine. In addition to driving the cutter, the motor drives a fluid pump 124, which by conventional means well understood in the art, supplied fluid under pressure to the valves 84, 86, 88, which valves in turn control fluid operation of the several hydraulic cylinders 34, 42, and 64 as previously explained. The starter battery for the motor is indicated at 126, FIG. 2, and the fuel tank is denoted 128.

Means may be provided for conveying chips from the cutter 60 to a location remote from the work. Such means may include a blower 130 driven by motor 122, and a conveyor screw 132 operating in conjunction with the blower, to drive the chips through a discharge pipe 134. Pipe 134 may deliver the chips toward the rear of the machine as shown, and possibly into a truck or other receptacle located adjacent thereto. The pipe may carry at its outlet terminal an adjustable deflector 136 for directing chips along a desired course.

Conveyor screw 132 rotates in a trough or duct 138 fixed upon the cantilever frame 56, and extending from cutter housing 98 to the vicinity of pivot 58. Adjacent to housing 98 is a curved hood 140 (FIGS. 4 and 6), which overlies trough 138 in position to catch chips thrown rearwardly and upwardly by the cutter, and to direct such chips through side openings 142 of the trough. Deflectors 144 within the trough direct the chips onto the rotating screw, which moves the chips within the trough toward the rear end 145 thereof.

At a location near the rear end of the trough, the trough is provided with an opening 146 in its bottom (FIG. 5), which communicates with a manifold 148 into which the chips or cuttings may be released. The manifold 148, FIG. 9, has an open rear end 150 connected to discharge pipe 134, and an open forward end 152 connected to blower conduit 154. The air blast from the blower advances or propels the chips through the discharge pipe. If desirable or necessary, the conveyor screw housing or trough 138 may be provided with a group of small holes 156, formed perferably in the bottom of the trough, to permit the finer chip particles and dirt to drop out, performing as a separator screen.

The reference numerals 158 and 160 indicate hinged doors on the conveyor screw housing and manifold 148, permitting inspection and access. It should be understood that use of the air blast as a conveying medium for chips may suffice, with possible omission of the conveyor screw.

Numeral 162 indicates a chip deflector, and at 164 is indicated a master distributor unit for fluid pressure supplied to the valves and hydraulic cylinders hereinbefore mentioned.

The numeral 165 denotes the control lever of a valve (not illustrated) by which the operating characteristics of the screw conveyor may be controlled by the operator.

It is to be understood that various modifications and changes may be made in the structural details of the device, within the scope of the appended claims, without departing from the spirit of the invention.

What is claimed is:

1. A stump cutter comprising in combination: an elongate chassis having a forward end, a rear end, and spaced wheels supporting the forward end above ground level; a power driven stump cutting tool; frame means shiftably supported upon the chassis for forward and rearward movement thereon, an engine mounted upon said frame means, means connecting said engine to said stump cutting tool for powering said tool, said frame means having a forward end supporting the cutting tool; and means for shifting said frame means to elevate and lower the cutting tool, and to traverse said tool both longitudinally and laterally of the chassis across the stump.

2. The device as set forth in claim 1, wherein the cutting tool projects forwardly of the chassis wheels in all shifted positions of the frame means.

3. A stump cutter comprising in combination: an elongate chassis having a forward end, a rear end, and spaced wheels supporting the forward end above ground level; a carriage reciprocable upon the chassis lengthwise thereof intermediate said ends; a first frame tiltably mounted upon the carriage for movement toward and from the forward end of the chassis; a second frame supported upon the first frame for tilting movement therewith, said second frame having a forward end portion movable toward and from ground level as the first frame is tilted in opposite directions; a power driven cutting tool on the forward end of the second frame for engaging a stump to be disintegrated; means for tilting the second frame in opposite directions for elevating and lowering the cutting tool; and means for reciprocating the carriage lengthwise of the chassis, to advance and retract the cutting tool across the stump.

4. The device as set forth in claim 3, wherein the cutting tool projects forwardly of the chassis wheels in all positions of the carriage.

5. A stump cutter comprising in combination: an elongate chassis having a forward end, a rear end, and spaced wheels supporting the forward end above ground level; a power drivable stump cutting tool; frame means shiftably supported upon the chassis, said frame means having a forward end supporting the cutting tool; and hydraulic means for shifting said frame means to elevate and lower the cutting tool, and to traverse said tool laterally of the chassis across the stump, said hydraulic means having power sufficient to lift and laterally shift the wheels and the forward end of the chassis, while the tool is forced downwardly upon the stump during shifting of the frame means relative to the chassis.

6. The device as set forth in claim 5, wherein the cutting tool projects forwardly of the chassis wheels in all shifted positions of the frame means.

7. A stump cutter comprising in combination: an elongate chassis having a forward end, a rear end, and means supporting the forward end above ground level; a power driven stump cutting tool; frame means shiftably supported upon the chassis, said frame means having a forward end supporting the cutting tool; means for shifting said frame means to elevate and lower the cutting tool, and to traverse said tool both longitudinally and laterally of the chassis across the stump; a hood mounted upon the frame means adjacent to the cutting tool, for receiving chips produced by the tool; an elongate duct having opposite sides and a bottom, said duct extending longitudinally of the chassis from the hood rearwardly, and having openings in the sides thereof communicating with the hood, to receive chips produced by the tool and directed thereby to the hood, said duct having a bottom opening at a location remote from the hood; a rotary conveyor screw in the duct for moving chips from the vicinity of the side openings to said bottom opening; a chambered manifold having a top opening in communication with the bottom opening of the duct to receive chips therefrom, the chamber of the manifold having a pair of aligned ports disposed transversely of the top opening thereof; means associated with one of said ports for directing a current of air from said one port into the remaining port, to create a blast of air throughout the duct containing the conveyor screw; and a discharge pipe in communication with the remaining port aforesaid, for conveying air and chips from the manifold chamber to a remote location.

8. A stump cutter comprising in combination: an elongate chassis having a forward end, a rear end, and spaced wheels supporting the forward end above ground level; a carriage reciprocable upon the chassis lengthwise thereof intermediate said ends; a rock frame pivotally mounted upon the carriage for tilting movement toward and from the forward end of the chassis; an elongate cantilever frame having a forward end and a rear end; means pivoting the rear end of the cantilever frame upon the rock frame, with the forward end of the cantilever frame projected toward the forward end of the chassis; the pivot means of the cantilever frame being on an upright axis, whereby the forward end of the cantilever frame is swingable laterally of the forward end of the chassis; a power actuatable cutting tool on the forward end of the cantilever frame, for engaging a stump to be disintegrated, said tool being movable with the forward end of the cantilever frame to elevated and lowered positions relative to the stump as the rock frame tilts upon the carriage; means for tilting the rock frame in opposite directions about its pivotal mounting; means for swinging the cantilever frame in opposite directions about its upright pivot; means for reciprocating the carriage longitudinally upon the chassis; and means for power actuating the cutting tool.

9. The device as set forth in claim 8, wherein the cutting tool projects forwardly of the chassis wheels in all shifted positions of the carriage.

10. The device as set forth in claim 8, wherein the combination includes control means located adjacent to one of the chassis wheels, for selectively controlling movements of the carriage, the rock frame, and the cantilever frame.

11. A stump cutter comprising in combination: an elongate chassis having a forward end, a rear end, and spaced wheels supporting the forward end above ground level; a carriage reciprocable upon the chassis lengthwise thereof; a rock frame pivotally mounted upon the carriage for tilting movement toward and from the forward end of the chassis; an elongate cantilever frame having a forward end and a rear end; means pivoting the rear end of the cantilever frame upon the rock frame at a point remote from the rock frame pivot, with the forward end of the cantilever frame projected toward the forward end of the chassis; the pivot means of the cantilever frame being upon an upright axis, whereby the forward end of the cantilever frame is swingable laterally of the longitudinal axis of the chassis; a power actuatable cutting tool on the forward end of the cantilever frame, for engaging a stump to be disintegrated, said tool being movable with the forward end of the cantilever frame to elevated and lowered positions relative to the stump as the rock frame tilts upon the carriage; a hood mounted upon the cantilever frame adjacent to the cutting tool, for receiving chips produced by the tool; a duct communicating with the hood to convey the chips to a location remote from the cutting tool; means enforcing movement of the chips through the duct and away from the hood; means under the control of an attendant for tilting the rock frame in opposite directions about its pivotal mounting; means under the control of an attendant for swinging the cantilever frame in opposite directions about its upright pivot; means under the control of an attendant for moving the carriage longitudinally in opposite directions upon the chassis; and means for power actuating the cutting tool.

12. The device as set forth in claim 11, wherein the cantilever frame is of such length that the cutting tool carried thereby operates at a location in advance of the wheels supporting the chassis.

13. A stump cutter comprising in combination: an elongate chassis having a forward end, a rear end, and spaced wheels supporting the forward end above ground level; a carriage reciprocable upon the chassis lengthwise thereof; a rock frame pivotally mounted upon the carriage for tilting movement toward and from the forward end of the chassis; an elongate cantilever frame having a forward end and a rear end; means pivoting the rear end of the cantilever frame upon the rock frame at a point remote from the rock frame pivot, with the forward end of the cantilever frame projected toward the forward end of the chassis; the pivot means of the cantilever frame being upon an upright axis, whereby the forward end of the cantilever frame is swingable laterally of the longitudinal axis of the chassis; a power actuatable cutting tool on the forward end of the cantilever frame, for engaging a stump to be disintegrated, said tool being movable with the forward end of the cantilever frame to elevated and lowered positions relative to the stump as the rock frame tilts upon the carriage; hydraulic means under the control of an operator, for moving the carriage, the rock frame, and the cantilever frame as stated; and means for power actuating the cutting tool.

14. The device as set forth in claim 13, wherein said power means for actuating the cutting tool includes a motor mounted upon the cantilever frame, and power transmission means carried by said frame for transmitting motion of said motor to the cutting tool.

15. A stump cutter comprising in combination: an elongate chassis including a forward yoke having a pair of spaced substantially parallel legs and a leg-connecting portion, the legs being extended in a common direction forwardly of the chassis; a pair of supporting wheels each rotatably mounted upon a leg near the free end thereof; a pair of spaced parallel rails having opposite ends, two corresponding ends of the rails being fixed to the connecting portion of the yoke, with the rails extended rearwardly in a direction opposite to the direction of the extension of the yoke legs; a draw bar connecting the remaining two ends of the rail, whereby the chassis may be towed with the yoke and wheels in trailing position; a carriage reciprocable upon the rails lengthwise between the yoke and the draw bar; a rock frame pivotally mounted upon the carriage for tilting movement toward and from the yoke in a plane perpendicular to the plane of the yoke legs; an elongate cantilever frame having a forward end and a rear end; means pivoting the rear end of the cantilever frame upon the rock frame at a point remote from the rock frame pivot, with the forward end of the cantilever frame projected forwardly intermediate the legs of the yoke; the pivot means of the cantilever frame being upon an upright axis, whereby the forward end of the cantilever frame is swingable laterally between the legs of the yoke; a power actuatable cutting tool mounted on the forward end of the cantilever frame, for engaging a stump to be disintegrated, said tool being movable with the forward end of the cantilever frame to elevated and lowered positions relative to the stump as the rock frame tilts upon the carriage; hydraulic means under the control of an operator, for moving the carriage, the rock frame, and the cantilever frame as stated; and motor means on the cantilever frame for actuating the cutting tool.

16. The device as set forth in claim 15, wherein the cantilever frame is of a length dimension such that the cutting tool carried thereby extends well forward of the supporting wheels, when the carriage is located close to the yoke.

17. The method of disintegrating a tree stump by chipping with a power rotatable cutting tool having cantilever frame support upon a wheeled chassis, and which cantilever frame and tool have movement in both a horizontal and a vertical plane, said method comprising: tilting the frame to lower the tool upon a selected area of the stump, and traversing the rotating tool across the stump laterally and longitudinally, to disintegrate only a selected portion of the stump to a desired level below grade; then elevating the frame and the tool, and stopping rotation of the tool; then swinging the frame laterally to poise the tool above the uncut portion of the stump; lowering the tool upon said uncut portion to lift the wheeled chassis off the ground; swinging the frame laterally to re-position the chassis relative to the stump; elevating the frame and tool to lower the chassis to a new position upon the ground; then resuming rotation of the tool and traversing the tool across the stump laterally and longitudinally, to disintegrate the remaining portion of the stump to a desired level below grade.

18. The method of disintegrating a tree stump by chipping with a power rotatable cutting tool shiftably mounted upon an elongate chassis for relative movement to elevated and lowered positions, and to lateral positions of displacement relative to the major axis of the chassis, said method comprising: lowering the tool upon a selected area of the stump, and rotating and traversing the tool across the stump laterally and longitudinally, to disintegrate only a selected portion of the stump to a desired level below grade; then elevating the tool, and stopping rotation thereof; then swinging the tool to a laterally displaced position at which the tool is poised above the uncut portion of the stump; then lowering the tool upon said uncut portion to lift the chassis off the ground; then swinging the tool laterally to re-position the chassis relative to the stump; elevating the tool to lower the chassis to a new position upon the ground; then resuming rotation of the tool and traversing the tool across the stump laterally and longitudinally, to disintegrate the remaining portion of the stump to a desired level below grade.

References Cited by the Examiner

UNITED STATES PATENTS

| | | |
|---|---|---|
| 1,313,709 | 8/1919 | McKoy et al. |
| 2,821,216 | 1/1958 | West et al. _____ 144—221 XR |
| 2,912,022 | 11/1959 | Ploeg et al. |
| 2,927,613 | 3/1960 | Franzen et al. |
| 3,044,509 | 7/1962 | Kehler. |
| 3,198,224 | 8/1965 | Hikey. |

WILLIAM W. DYER, JR., *Primary Examiner.*

W. D. BRAY, *Assistant Examiner.*